(12) United States Patent
Sekar et al.

(10) Patent No.: US 11,234,245 B1
(45) Date of Patent: Jan. 25, 2022

(54) BEAMFORMING IN MASSIVE MIMO NETWORKS

(71) Applicant: Sprint Spectrum LP, Overland Park, KS (US)

(72) Inventors: Muthukumaraswamy Sekar, Brambleton, VA (US); Sathyanarayanan Raghunathan, Herndon, VA (US); Maheswaran Vijayakumar, Herndon, VA (US); Suresh Majjara, Herndon, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 75 days.

(21) Appl. No.: 16/546,681

(22) Filed: Aug. 21, 2019

(51) Int. Cl.
    | | |
    |---|---|
    | *H04W 72/08* | (2009.01) |
    | *H04B 7/0417* | (2017.01) |
    | *H04B 7/06* | (2006.01) |
    | *H04W 72/00* | (2009.01) |

(52) U.S. Cl.
    CPC ........ *H04W 72/082* (2013.01); *H04B 7/0417* (2013.01); *H04B 7/0617* (2013.01); *H04B 7/0632* (2013.01); *H04W 72/005* (2013.01)

(58) Field of Classification Search
    None
    See application file for complete search history.

(56) References Cited

U.S. PATENT DOCUMENTS

| | | | | |
|---|---|---|---|---|
| 9,392,639 | B2* | 7/2016 | Josiam | H04W 88/02 |
| 2008/0123520 | A1* | 5/2008 | Ji | H04W 72/1252 |
| | | | | 370/216 |
| 2015/0349867 | A1* | 12/2015 | Guo | H04B 7/0632 |
| | | | | 370/252 |
| 2016/0204960 | A1* | 7/2016 | Yu | H04L 25/0224 |
| | | | | 370/338 |
| 2016/0241323 | A1* | 8/2016 | Ko | H04B 7/0452 |
| 2016/0295513 | A1* | 10/2016 | Moon | H04L 5/006 |
| 2017/0311276 | A1* | 10/2017 | Tsai | H04L 27/2602 |
| 2018/0092080 | A1* | 3/2018 | Kim | H04W 72/044 |
| 2018/0199212 | A1* | 7/2018 | Lin | H04B 7/005 |
| 2018/0234154 | A1* | 8/2018 | Chen | H04B 7/0417 |
| 2019/0037429 | A1* | 1/2019 | Davydov | H04L 5/0035 |
| 2019/0229789 | A1* | 7/2019 | Zhang | H04W 16/28 |
| 2019/0327716 | A1* | 10/2019 | Wang | H04B 17/382 |
| 2019/0369201 | A1* | 12/2019 | Akkarakaran | G01S 1/0428 |
| 2020/0112355 | A1* | 4/2020 | Park | H04B 7/0626 |

\* cited by examiner

*Primary Examiner* — Hassan A Phillips
*Assistant Examiner* — Gautam Sharma

(57) ABSTRACT

Beamforming in massive MIMO networks includes monitoring beamforming feedback from one or more wireless devices attached to an access node, when the beamforming feedback degrades, increasing a subcarrier spacing of the access node, and when the beamforming feedback stops degrading, maintaining or reducing the subcarrier spacing of the access node.

17 Claims, 5 Drawing Sheets

BEAMFORMING IN MASSIVE MIMO NETWORKS

TECHNICAL BACKGROUND

As wireless networks evolve and grow, there are ongoing challenges in providing high-quality service to increasing numbers of wireless devices in various coverage areas of a wireless network. Wireless networks may be configured to utilize massive multiple-input multiple-output (mMIMO), in which multiple data streams can be directed towards a plurality of wireless devices that are selected to participate in a MIMO operating mode based on the orthogonality of transmission, thereby maximizing resources. MIMO has been identified as one of the promising air interface technologies to address the capacity requirement required demanded by 5G networks, and increasingly access nodes with multiple antenna arrays are being deployed in wireless networks.

However, mMIMO enabled wireless networks continue to suffer from problems similar to previous networks, such as varying signal conditions of wireless devices attached to access nodes, and inefficient formation of beams (i.e. transmission of formed beams) to said wireless devices. For example, mMIMO access nodes are configured to transmit reference signals to wireless devices attached thereto and, based on the feedback related to reception of these reference signals received back at the mMIMO access nodes, to form beams directed (or steered) towards these wireless devices. Wireless devices report beamforming feedback differently based on the signal conditions and other factors. For example, wireless devices moving rapidly within a service area or sector (i.e., wireless devices having a high mobility) may encounter varying signal conditions, and may not be able to report feedback properly, in that the feedback may be processed too slowly for the access node to respond with accurate and/or targeted beam formation towards such wireless devices. Further, wireless devices encountering poor signal conditions such as interference, etc. may be unable to properly transmit the beamforming feedback, or may report the poor signal conditions in their feedback. In either case, the consequences of poor feedback reporting (i.e. feedback degradation) means that the formed beam may not adequately meet the needs of the wireless device, such as a QoS requirement, or application requirement of the wireless device. Finally, these issues are aggravated when the access node is heavily loaded.

Overview

Exemplary embodiments described herein include methods, systems, and processing nodes for beamforming in mMIMO networks. An exemplary method for beamforming in mMIMO networks includes monitoring beamforming feedback from one or more wireless devices attached to an access node, wherein the access node is configured to steer one or more formed beams towards the one or more wireless devices; and when the beamforming feedback degrades, increasing a subcarrier spacing of the access node.

An exemplary system for beamforming in mMIMO networks includes a processing node and a processor coupled to the processing node. The processor may be configured to perform operations including: responsive to determining that an average beamforming feedback received at an access node suffers from a threshold degradation, increasing a subcarrier spacing of the access node, and responsive to determining that the average beamforming feedback improves from the threshold degradation, reducing the subcarrier spacing of the access node.

An exemplary processing node for beamforming in mMIMO networks is configured to perform operations including monitoring beamforming feedback from one or more wireless devices attached to an access node, when the beamforming feedback degrades, increasing a subcarrier spacing of the access node, and when the beamforming feedback stops degrading, maintaining or reducing the subcarrier spacing of the access node.

DETAILED DESCRIPTION

Figure 1:
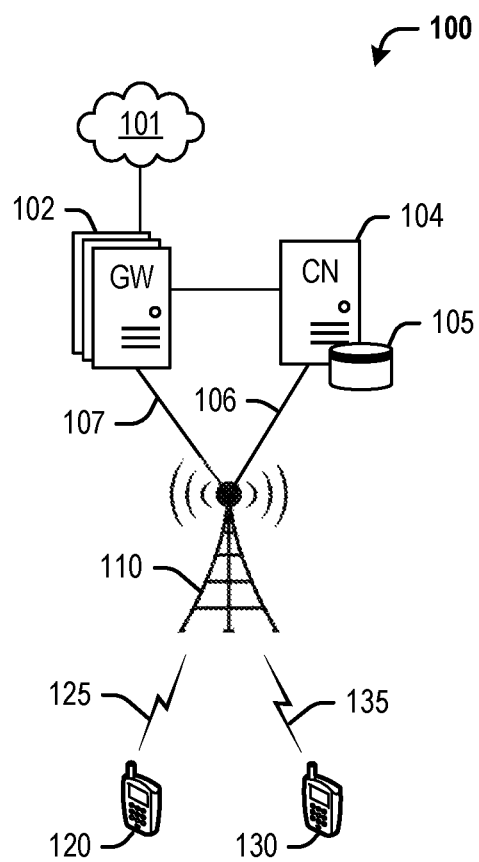
FIG. 1 illustrates an exemplary system for beamforming in mMIMO wireless networks.

The disclosed embodiments illustrate methods, systems, and processing nodes for beamforming in mMIMO wireless networks by changing a subcarrier spacing for an access node based on an average beamforming feedback for wireless devices attached to the access node. For example, two or more wireless devices can be attached to a 5G New Radio (NR) access node (also referred to as a gNodeB or gNB), and configured to utilize a low subcarrier spacing or any subcarrier spacing that is below a threshold (e.g. 15 kHz or lower). The access node may include an access node of any type, including macrocell access nodes such as Long-Term-Evolution (LTE) eNodeBs or 5G New Radio (NR) gNodeBs, mini access nodes, home eNodeBs or gNodeBs, etc., and may include a plurality of antennae arranged in one or more arrays, wherein each antenna array is configured to steer or form one or more beams over a geographical region referred to herein as a "sector." Thus, in exemplary embodiments described herein, the one or more wireless devices may be operating within a sector deployed an antenna array of the access node. The access node can be configured to form the device-specific beams towards each wireless device, based in part on a feedback provided by each wireless device. For example, the feedback can be provided by each wireless device in response to receiving a reference signal broadcast from the access node. Different types of reference signals can be transmitted to each wireless device based on signal conditions of the wireless devices. For example, the types of reference signals include a non-precoded reference signal, a beamformed reference signal, or a standard reference signal.

In either case, the feedback can degrade based on a number of reasons, such as a mobility of one or more wireless devices exceeding a threshold, a speed of the one or more wireless devices exceeding a threshold, interference in a signal path of the one or more wireless devices, etc. As described above, this results in poor assignment of the formed beam directed towards the one or more wireless devices, which can cause additional poor feedback. Thus, as described herein, a subcarrier spacing is increased for an access node (or wireless sector deployed therefrom) based on determining that the feedback degrades to meet a low threshold. Increasing the subcarrier spacing decreases the latency for the feedback, thereby improving the effectiveness of the feedback. For example, feedback transmitted at more frequent intervals (such as a transmission time interval or TTI) can improve the formation of the formed beam faster, thereby enabling fast-moving (or high-mobility) wireless devices to receive more accurately formed beams, thereby improving feedback and overall throughput of the sector. Further, when the feedback is consistently good, the subcarrier spacing may be reduced again, and these operations performed iteratively and in real-time. Determining the degradation in the feedback to determine whether or not to increase (or decrease) the subcarrier spacing for an access node or a sector deployed therefrom can include monitoring an average of the beamforming feedback from all the beamforming capable wireless devices attached to the access node or within the sector. For example, channel state information (CSI) provided by the wireless devices can be monitored. Alternatively or in addition, a reported signal to interference-plus-noise ratio (SINR), and errors or delay in the feedback itself may be monitored to determine the degradation.

Similar operations may be performed by an exemplary system described herein and comprising at least a processing node and a processor coupled to the processing node. The processing node can be communicatively coupled to any other network node within the wireless network, such as an access node or a controller node. These and other embodiments are further described herein and with reference to FIGS. 1-6.

FIG. 1 depicts an exemplary system 100 for beamforming in mMIMO wireless networks. System 100 comprises a communication network 101, gateway 102, controller node 104, access node 110, and wireless devices 120 and 130. Access node 110 may include an access node of any type, including macrocell access nodes such as Long-Term-Evolution (LTE) eNodeBs or 5G New Radio (NR) gNodeBs, mini access nodes, home eNodeBs or gNodeBs, etc., and may include a plurality of antennae arranged in one or more arrays, wherein each antenna array is configured to steer or form one or more beams to wireless devices attached thereto, including wireless devices 120, 130. Access node 110 communicates with wireless devices 120, 130 over corresponding wireless communication links 125, 135, which can include direct communication links, formed beams, multiple-input-multiple-output (MIMO), and so on.

As described herein, a processing node communicatively coupled to any network node within system 100 (such as, for example, access node 110 or controller node 104) can be configured to monitor a beamforming feedback from wireless devices 120, 130 and, when the beamforming feedback degrades, increasing a subcarrier spacing of a radio air interface deployed by access node 110. In other words, access node 110 (or a processing node coupled thereto) can be configured to increase a subcarrier spacing of the access node 110 responsive to determining that an average beamforming feedback of received at access node 110 from wireless devices 120, 130 suffers from a threshold degradation, and to reduce the subcarrier spacing responsive to determining that the average beamforming feedback improves from the threshold degradation.

Further, system 100 can be configured to identify the one or more wireless devices 120, 130 as being capable of utilizing mMIMO. This can include, for example, identifying a device capability from an attach request, or referring to database 105 for information associated with each wireless device 120, 130. The average beamforming feedback may be monitored for degradation. The feedback from each wireless device 120, 130 can indicate degradation in response to various reasons, such as a mobility of one or more wireless devices 120, 130 exceeding a threshold, a speed of the one or more wireless devices 120, 130 exceeding a threshold, interference in a signal path of the one or more wireless devices 120, 130, etc. For example, a SINR, interference or CQI reported by wireless devices 120, 130 can be based on a reference signal received at each wireless device 120, 130 from access node 110. Thus, an average of any of these values from all wireless devices attached to access node 110 (including wireless device 120, 130) is compared with a threshold, below which the subcarrier spacing of access node 110 is increased. In an exemplary embodiment, the threshold may be based on an average SINR reported by wireless devices 120, 130, the threshold SINR comprising 0 dB or −2 dB.

Further, wireless devices 120, 130 may be located within one sector from among a plurality of sectors deployed by the access node 110, and the subcarrier spacing is increased for each sector independently based on the average beamforming feedback of wireless devices within each sector. Further, it may be determined that the subcarrier spacing of the access node 110 (or sector deployed therefrom) is below a threshold subcarrier spacing prior to increasing the subcarrier spacing. In other words, the monitoring of the average beamforming feedback in order to determine whether or not to increase the subcarrier spacing may only be performed in the case that the subcarrier spacing is already low. For example, a threshold (or minimum) subcarrier spacing to enable these monitoring and increasing operations can include 15 kHz, 30 kHz, or 60 kHz. Thus, when the subcarrier spacing is at 15 kHz (or 30 kHz or 60 kHz), the subcarrier spacing can be increased in response to observing degradation in the beamforming feedback. For example, if the threshold subcarrier spacing is 15 kHz, for any sector with a higher subcarrier spacing (e.g. 30 kHz), an increase may not be necessary. Whereas, if average beamforming feedback for a sector degrades and the current subcarrier spacing is 15 kHz, then the subcarrier spacing may be increased. The subcarrier spacing can be increased incrementally until the beamforming feedback increases or improves past a degradation threshold. Further, the access node 110 can be configured to broadcast the adjusted subcarrier spacing to the one or more wireless devices 120, 130, for example by using a master information bit (MIB).

Access node 110 can be any network node configured to provide communication between wireless devices 120, 130 and communication network 101, including standard access nodes and/or short range, low power, small access nodes. For instance, access node 110 may include any standard access node, such as a macrocell access node, base transceiver station, a radio base station, next generation or gigabit NodeBs (gNBs) in 5G networks, or enhanced eNodeBs (eNBs) in 4G/LTE networks, or the like. In an exemplary embodiment, a macrocell access node can have a coverage area in the range of approximately five kilometers to thirty five kilometers and an output power in the tens of watts. In other embodiments, access node 110 can be a small access node including a microcell access node, a picocell access node, a femtocell access node, or the like such as a home NodeB or a home eNodeB device. Moreover, it is noted that while access node 110 and wireless devices 120, 130 are illustrated in FIG. 1, any number of access nodes and wireless devices can be implemented within system 100.

Access node 110 can comprise processors and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicate with gateway node 102 and controller node 104 via communication links 106, 107. Access node 110 may communicate with other access nodes (not shown) using a direct link such as an X2 link or similar.

Wireless devices 120, 130 may be any device, system, combination of devices, or other such communication platform capable of communicating wirelessly with access node 110 using one or more frequency bands deployed therefrom. Wireless devices 120, 130 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access node 110. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 120, 130. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Communication links 106, 107 may include Si communication links. Other wireless protocols can also be used. Communication links 106, 107 can be a direct link or might include various equipment, intermediate components, systems, and networks. Communication links 106, 107 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) or 5G NR, and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information, such as mMIMO capabilities and historical signal conditions for wireless devices attached to access node 110, default subcarrier spacings for sectors deployed by access node 110, and so on. This information may be requested by or shared with access node 110 via communication links 106, 107, X2 connections, and so on. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

The methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 may be, comprise, or include computers systems and/or processing nodes, including access nodes, controller nodes, and gateway nodes described herein.

Figure 2:
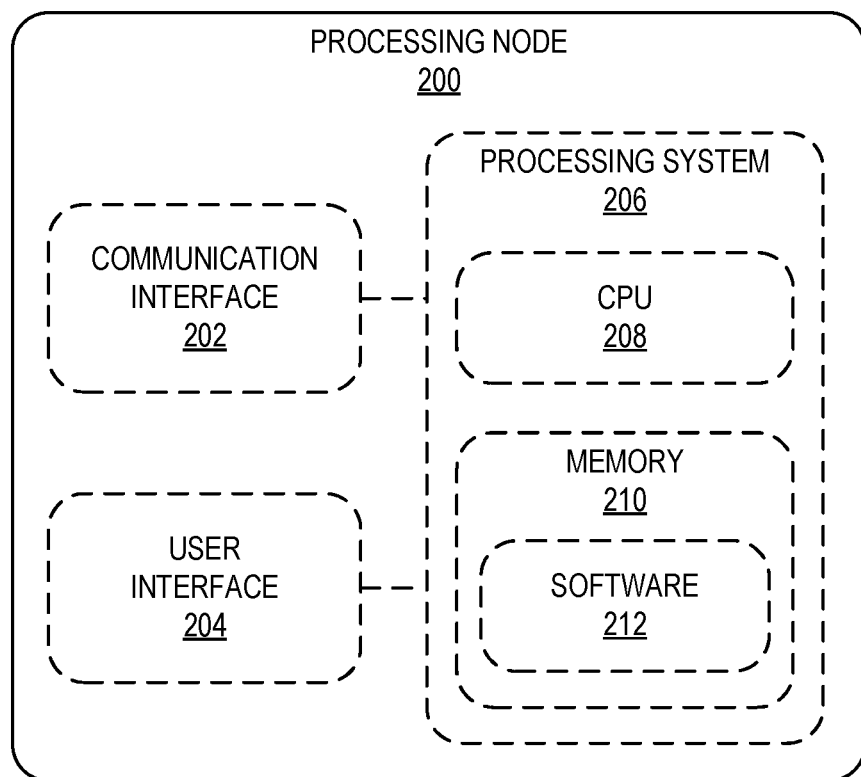
FIG. 2 illustrates an exemplary processing node for beamforming in mMIMO wireless networks.

FIG. 2 depicts an exemplary processing node 200 for beamforming in a mMIMO wireless network. Processing node comprises a communication interface 202, user interface 204, and processing system 206 in communication with communication interface 202 and user interface 204. Processing system 206 includes a central processing unit (CPU) 208, and a memory 210, which can comprise a disk drive, flash drive, memory circuitry, or other memory device. Memory 210 can store computer programs, firmware, or some other form of machine-readable instructions, including an operating system, utilities, drivers, network interfaces, applications, or some other type of software. Further, memory 210 can store software 212, which may be executed to perform the operations described herein. Processing system 206 may include other circuitry to retrieve and execute software 212 from memory 210. Processing node 200 may further include other components such as a power management unit, a control interface unit, etc., which are omitted for clarity. Communication interface 202 permits processing node 200 to communicate with other network elements. User interface 204 permits the configuration and control of the operation of processing node 200.

In an exemplary embodiment, software 212 includes instructions that enable processing node 200 to perform operations including monitoring beamforming feedback from one or more wireless devices attached to an access node, wherein the access node is configured to steer one or more formed beams towards the one or more wireless devices; and when the beamforming feedback degrades, increasing a subcarrier spacing of the access node. In another exemplary embodiment, software 212 includes instructions that enable processing node 200 to perform operations including increasing a subcarrier spacing of an access node responsive to determining that an average beamforming feedback received at the access node suffers from a threshold degradation, and reducing the subcarrier spacing of the access node responsive to determining that the average beamforming feedback improves from the threshold degradation. In yet another exemplary embodiment, software 212 includes instructions that enable processing node 200 to perform operations including monitoring beamforming feedback from one or more wireless devices attached to an access node, when the beamforming feedback degrades, increasing a subcarrier spacing of the access node, and when the beamforming feedback stops degrading, maintaining or reducing the subcarrier spacing of the access node.

Figure 3:
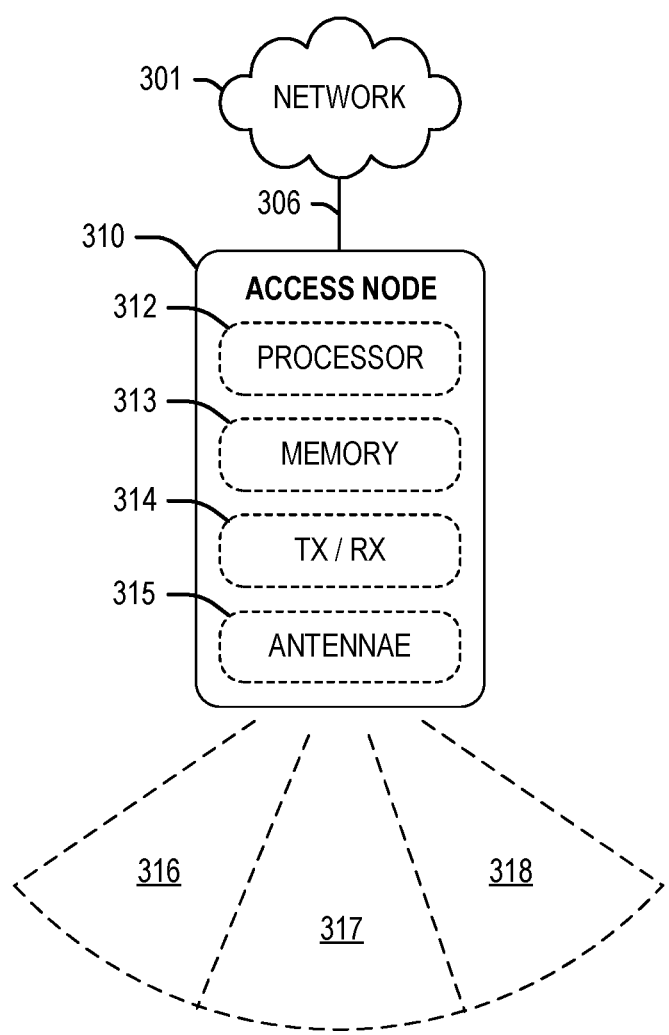
FIG. 3 illustrates an exemplary access node for beamforming in mMIMO wireless networks.

FIG. 3 depicts an exemplary access node 310 for selecting a subcarrier spacing in a wireless network. Access node 310 may be configured as an access point for providing network services from network 301 to end-user wireless devices via a radio-air interface deployed therefrom. Access node 310 is illustrated as comprising a processor 312, a memory 313 (for storing instructions that are performed by processor 312), a transceiver 314, and antennae 315 for deploying a radio air interface over wireless sectors 316, 317, and 318. One pair of transceivers and antennae are illustrated herein solely to simplify the written description, and it may be evident to those having ordinary skill in the art, that any combination of transceivers and antennae may be incorporated in order to deploy different sectors that are configured to utilize mMIMO, which includes formed beams, MU-MIMO data streams, and/or to facilitate communication with other network nodes on network 301. Further, access node 310 is communicatively coupled to network 301 via communication interface 306, which may be any wired or wireless link as described above.

In an exemplary embodiment, memory 313 includes instructions that enable access node 310 to perform operations including monitoring beamforming feedback from one or more wireless devices attached to access node 310, wherein the access node 310 is configured to steer one or more formed beams towards the one or more wireless devices; and when the beamforming feedback degrades, increasing a subcarrier spacing of one or more of sectors 316, 317, 318 based on the beamforming feedback in those sectors. In another exemplary embodiment, the instructions in memory 313 include increasing a subcarrier spacing of each sector 316, 317, 318 responsive to determining that an average beamforming feedback from wireless devices in each of sectors 316, 317, 318 received at access node 310 suffers from a threshold degradation, and reducing the subcarrier spacing of each sector 316, 317, 318 responsive to determining that the average beamforming feedback improves from the threshold degradation. In yet another exemplary embodiment, the instructions in memory 313 include monitoring beamforming feedback from one or more wireless devices in each sector 316, 317, 318, when the beamforming feedback degrades, increasing a subcarrier spacing of the sector 316, 317, 318, and when the beamforming feedback stops degrading, maintaining or reducing the subcarrier spacing of the sector 316, 317, 318.

Figure 4:
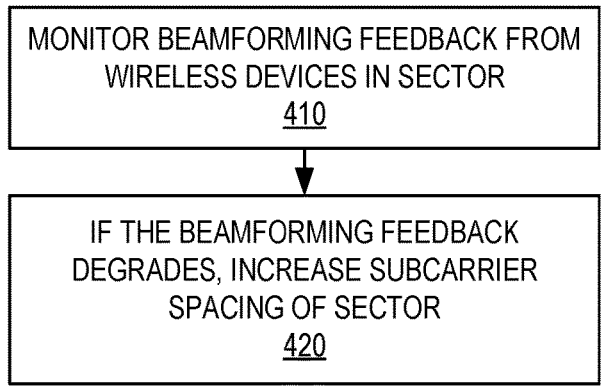
FIG. 4 illustrates an exemplary method for beamforming in mMIMO wireless networks.

FIG. 4 illustrates an exemplary method for beamforming in mMIMO networks. The method will be discussed with reference to the exemplary communication system 100 illustrated in FIG. 1. However, the method can be implemented with any suitable communication system. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

At 410, a beamforming feedback is monitored for wireless devices in a sector. For example, two or more wireless devices can be attached to a 5G New Radio (NR) access node (also referred to as a gNodeB or gNB). The access node may include an access node of any type, including macrocell access nodes such as Long-Term-Evolution (LTE) eNodeBs or 5G New Radio (NR) gNodeBs, mini access nodes, home eNodeBs or gNodeBs, etc., and may include a plurality of antennae arranged in one or more arrays, wherein each antenna array is configured to steer or form one or more beams over a geographical region referred to herein as a "sector." Thus, in exemplary embodiments described herein, the one or more wireless devices may be operating within a sector deployed an antenna array of the access node. The access node can be configured to form the device-specific beams towards each wireless device, based in part on a feedback provided by each wireless device. Monitoring the feedback can include monitoring an average of the beamforming feedback from all the beamforming capable wireless devices attached to the access node or within the sector. For example, channel state information (CSI) provided by the wireless devices can be monitored. Alternatively or in addition, a reported signal to interference-plus-noise ratio (SINR), and errors or delay in the feedback itself may be monitored.

Further, at 420, if the beamforming feedback degrades, a subcarrier spacing of the sector is increased. For example, the feedback can be provided by each wireless device in response to receiving a reference signal broadcast from the access node. Different types of reference signals can be transmitted to each wireless device based on signal conditions of the wireless devices. For example, the types of reference signals include a non-precoded reference signal, a beamformed reference signal, or a standard reference signal. In either case, the feedback can degrade based on a number of reasons, such as a mobility of one or more wireless devices exceeding a threshold, a speed of the one or more wireless devices exceeding a threshold, interference in a signal path of the one or more wireless devices, etc. As described above, this results in poor assignment of the formed beam directed towards the one or more wireless devices, which can cause additional poor feedback. Thus, a subcarrier spacing is increased for an access node (or wireless sector deployed therefrom) based on determining that the feedback degrades to meet a low threshold. Increasing the subcarrier spacing decreases the latency for the feedback, thereby improving the effectiveness of the feedback. For example, feedback transmitted at more frequent intervals (such as a transmission time interval or TTI, or every few milliseconds) can improve the formation of the formed beam faster, thereby enabling fast-moving (or high-mobility) wireless devices to receive more accurately formed beams, thereby improving feedback and overall throughput of the sector. Further, when the feedback is consistently good, the subcarrier spacing may be reduced again, and these operations performed iteratively and in real-time. For example, the monitoring can include measuring or obtaining the average beamforming feedback every few milliseconds. Alternatively or on addition, the average beamforming feedback is continuously monitored, and averaged every few milliseconds.

Figure 5:
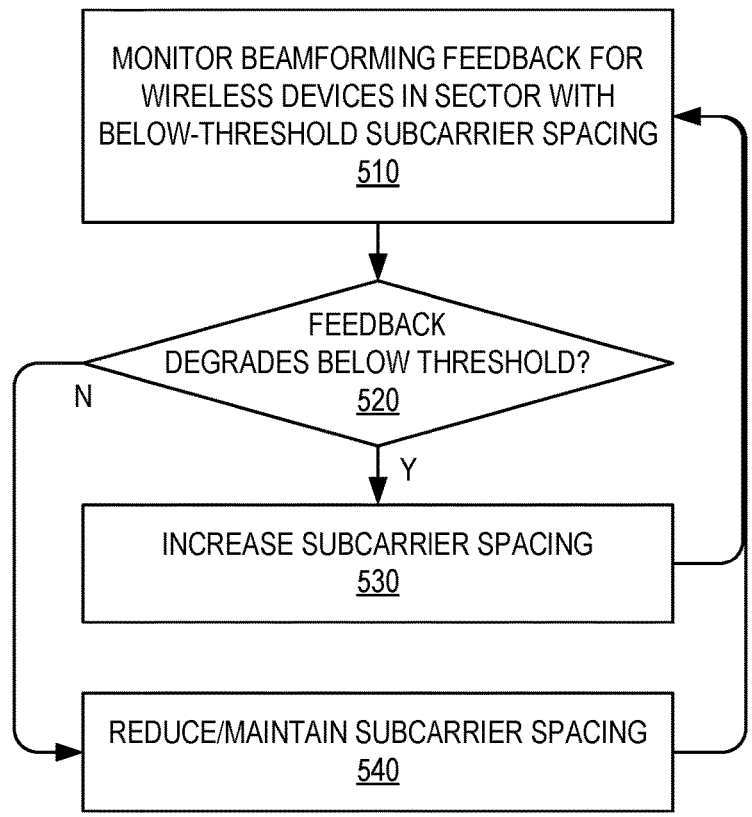
FIG. 5 illustrates another exemplary method for beamforming in mMIMO wireless networks.

FIG. 5 illustrates another exemplary method for beamforming in mMIMO networks. The method will be discussed with reference to the exemplary communication system 100 illustrated in FIG. 1. However, the method can be implemented with any suitable communication system. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

At 510, a beamforming feedback is monitored for wireless devices in a sector having a below-threshold subcarrier spacing. For example, two or more wireless devices can be attached to a 5G New Radio (NR) access node (also referred to as a gNodeB or gNB), and configured to utilize a low subcarrier spacing or any subcarrier spacing that is below a threshold (e.g. 15 kHz or lower). The access node may include an access node of any type, including macrocell access nodes such as Long-Term-Evolution (LTE) eNodeBs or 5G New Radio (NR) gNodeBs, mini access nodes, home eNodeBs or gNodeBs, etc., and may include a plurality of antennae arranged in one or more arrays, wherein each antenna array is configured to steer or form one or more beams over a geographical region referred to herein as a "sector." Thus, in exemplary embodiments described herein, the one or more wireless devices may be operating within a sector deployed an antenna array of the access node. The access node can be configured to form the device-specific beams towards each wireless device, based in part on a feedback provided by each wireless device. Monitoring the feedback can include monitoring an average of the beamforming feedback from all the beamforming capable wireless devices attached to the access node or within the sector. For example, channel state information (CSI) provided by the wireless devices can be monitored. Alternatively or in addition, a reported signal to interference-plus-noise ratio (SINR), and errors or delay in the feedback itself may be monitored. Further, it may be determined that the subcarrier spacing of the access node 110 (or sector deployed therefrom) is below a threshold subcarrier spacing prior to increasing the subcarrier spacing. In other words, the monitoring of the average beamforming feedback in order to determine whether or not to increase the subcarrier spacing may only be performed in the case that the subcarrier spacing is already low. For example, a threshold (or minimum) subcarrier spacing to enable these monitoring and increasing operations can include 15 kHz, 30 kHz, or 60 kHz.

Further, at 520, it is determined whether or not the beamforming feedback decreases below a threshold. If the beamforming feedback degrades, at 530, a subcarrier spacing of the sector is increased and, if the beamforming feedback does not degrade (or improves above the threshold), the subcarrier spacing is maintained or reduced to the default. For example, the feedback can be provided by each wireless device in response to receiving a reference signal broadcast from the access node. Different types of reference signals can be transmitted to each wireless device based on signal conditions of the wireless devices. For example, the types of reference signals include a non-precoded reference signal, a beamformed reference signal, or a standard reference signal. In either case, the feedback can degrade based on a number of reasons, such as a mobility of one or more wireless devices exceeding a threshold, a speed of the one or more wireless devices exceeding a threshold, interference in a signal path of the one or more wireless devices, etc. As described above, this results in poor assignment of the formed beam directed towards the one or more wireless devices, which can cause additional poor feedback. The feedback from each wireless device can indicate degradation in response to various reasons, such as a mobility of one or more wireless devices exceeding a threshold, a speed of the one or more wireless devices exceeding a threshold, interference in a signal path of the one or more wireless devices, etc. For example, a SINR, interference or CQI reported by each wireless device in a sector can be based on a reference signal received at each wireless device from the access node. An average of any of these values from all wireless devices attached to the access node (or within a sector deployed by the access node) is compared with a threshold at 520. In an exemplary embodiment, the average beamforming feedback is obtained every few milliseconds. For example, the beamforming feedback may be continuously monitored, and averaged every few milliseconds.

Thus, a subcarrier spacing is increased at 530 for an access node (or wireless sector deployed therefrom) based on determining that the feedback degrades to meet a low threshold. Increasing the subcarrier spacing decreases the latency for the feedback, thereby improving the effectiveness of the feedback. For example, feedback transmitted at more frequent intervals (such as a transmission time interval or TTI) can improve the formation of the formed beam faster, thereby enabling fast-moving (or high-mobility) wireless devices to receive more accurately formed beams, thereby improving feedback and overall throughput of the sector. Further, when the feedback is consistently good, the subcarrier spacing may be reduced again at 540, and these operations performed iteratively and in real-time.

Figure 6:
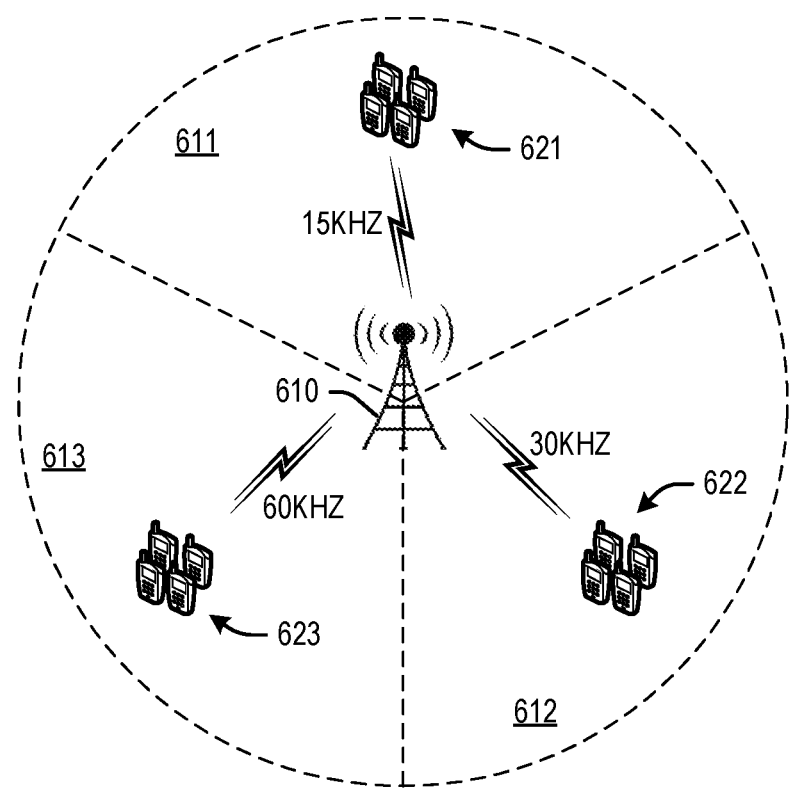
FIG. 6 illustrates exemplary selections of subcarrier spacings for different sectors in a mMIMO network.

FIG. 6 illustrates exemplary selections of subcarrier spacings for different sectors in a mMIMO network. Access node 610 may comprise a gNb as described above, and may include a plurality of antennae arranged in one or more arrays, wherein each antenna array is configured to steer or form one or more beams to wireless devices attached thereto, including wireless devices 621, 622, and 623 respectively located within sectors 611, 612, and 613. Further, access node 610 can be configured to monitor a beamforming feedback from the wireless devices in each sector 611, 612, 613, and when the beamforming feedback degrades, to increase a subcarrier spacing of a radio air interface deployed in one or more of sectors 611, 612, 613. In other words, access node 610 (or a processing node coupled thereto) can be configured to increase a subcarrier spacing of a sector responsive to determining that an average beamforming feedback of received at access node 610 from wireless devices 621, 622, 623 suffers from a threshold degradation, and to reduce the subcarrier spacing responsive to determining that the average beamforming feedback improves from the threshold degradation.

Further, access node 610 may be configured to identify the one or more wireless devices 621, 622, 623 as being capable of utilizing mMIMO. This can include, for example, identifying a device capability from an attach request. Thus, access node 610 can receive feedback from each wireless device 621, 622, 623 so as to form beams to said wireless devices. The feedback from each wireless device can indicate degradation in response to various reasons, such as a mobility exceeding a threshold, interference in a signal path, etc. For example, a SINR, interference or CQI reported by wireless devices 622 in sector 612 can be measured and averaged at access node 610, and determined to meet a threshold, upon which the subcarrier spacing of sector 612 is increased to 30 kHz. Similarly, the subcarrier spacing is increased for each sector 611, 612, 613 independently based on the average beamforming feedback of wireless devices within each sector. Further, it may be determined that the subcarrier spacing of a sector is below a threshold subcarrier spacing prior to increasing the subcarrier spacing. In other words, the monitoring of the average beamforming feedback in order to determine whether or not to increase the subcarrier spacing may only be performed in the case that the subcarrier spacing is already low. For example, a threshold (or minimum) subcarrier spacing to enable these monitoring and increasing operations can include 15 kHz, 30 kHz, or 60 kHz. Thus, when the subcarrier spacing of sector 612 may have been at 15 kHz, the subcarrier spacing can be increased to 30 kHz in response to observing degradation in the beamforming feedback from wireless devices 622. Further, for any sector with a higher subcarrier spacing (e.g. 30 kHz in sector 613), an increase may not be necessary.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the disclosure. The following claims specify the scope of the disclosure. Note that some aspects of the best mode may not fall within the scope of the disclosure as specified by the claims. Those skilled in the art will appreciate that the features described above can be combined in various ways to form multiple variations of the disclosure. As a result, the disclosure is not limited to the specific embodiments described above, but only by the following claims and their equivalents.

What is claimed is:

1. A method for beamforming in massive multiple-input multiple-output (mMIMO) wireless networks, the method comprising:
monitoring beamforming feedback from one or more wireless devices attached to an access node, wherein the access node is configured to steer one or more formed beams towards the one or more wireless devices;
determining an average beamforming feedback for all of the one or more wireless devices located within a first sector deployed by the access node; and
when the beamforming feedback degrades, increasing a subcarrier spacing of the first sector.

2. The method of claim 1, further comprising identifying the one or more wireless devices as being capable of utilizing mM IMO.

3. The method of claim 1, wherein the beamforming feedback comprises channel state information for the one or more wireless devices.

4. The method of claim 1, further comprising:
comparing the beamforming feedback to a threshold; and
when the beamforming feedback degrades below the threshold, increasing the subcarrier spacing of the first sector.

5. The method of claim 4, further comprising:
determining that the beamforming feedback improves to meet the threshold; and
reducing the subcarrier spacing of the first sector.

6. The method of claim 1, further comprising determining that the subcarrier spacing is below a threshold subcarrier spacing prior to increasing the subcarrier spacing.

7. The method of claim 6, wherein the threshold subcarrier spacing is one of 15 kHz, 30 kHz, or 60 kHz.

8. The method of claim 1, further comprising increasing the subcarrier spacing incrementally until the beamforming feedback increases.

9. The method of claim 1, further comprising instructing the access node to broadcast the adjusted subcarrier spacing to the one or more wireless devices.

10. A system for beamforming in massive multiple-input multiple-output wireless networks, the system comprising:
a processing node; and
a processor coupled to the processing node, the processor being configured to perform operations comprising:
responsive to determining that an average beamforming feedback for all wireless devices within a first sector deployed by an access node suffers from a threshold degradation, increasing a subcarrier spacing of the first sector; and
responsive to determining that the average beamforming feedback improves from the threshold degradation, reducing the subcarrier spacing of the first sector.

11. The system of claim 10, wherein:
determining that the average beamforming feedback suffers from the threshold degradation comprises determining that a signal to noise plus interference (SINR) level reported by wireless devices attached to the access node falls below a threshold SINR level, and
determining that the average beamforming feedback improves from the threshold degradation comprises determining that the SINR level rises above the threshold SINR level.

12. The system of claim 10, wherein:
determining that the average beamforming feedback suffers from the threshold degradation comprises determining that a channel quality indicator (CQI) reported by wireless devices attached to the access node falls below a threshold CQI, and
determining that the average beamforming feedback improves from the threshold degradation comprises determining that the CQI rises above a threshold CQI.

13. The system of claim 10, further comprising:
determining that a second average beamforming feedback received at the access node suffers from a threshold degradation, wherein the second average beamforming feedback is reported by wireless devices within a second sector deployed by the access node; and
increasing a subcarrier spacing for the second sector.

14. A processing node for beamforming in massive multiple-input multiple-output wireless networks, the processing node being configured to perform operations comprising:
monitoring beamforming feedback from one or more wireless devices attached to an access node;
when the average beamforming feedback of all wireless devices within a sector degrades, increasing a subcarrier spacing of the sector; and
when the average beamforming feedback stops degrading, maintaining or reducing the subcarrier spacing of the sector.

15. The processing node of claim 14, wherein the increasing and reducing operations are performed incrementally.

16. The processing node of claim 14, wherein the operations further comprise broadcasting the subcarrier spacing to all the wireless devices within the sector.

17. The processing node of claim 16, wherein the monitoring of the beamforming feedback is repeated periodically.

* * * * *